United States Patent [19]

Mitchell et al.

[11] Patent Number: 5,206,314
[45] Date of Patent: Apr. 27, 1993

[54] POLYOLEFIN POLYMERIZATION PROCESS, PROCESS OF PRODUCING CATALYST, AND CATALYST

[75] Inventors: Kent E. Mitchell, Bartlesville, Okla.; Paul F. Schubert, Campbell, Calif.; Gil R. Hawley, Dewey, Okla.

[73] Assignee: Phillips Petroleum Company, Bartlesville, Okla.

[21] Appl. No.: 938,725

[22] Filed: Aug. 31, 1992

[51] Int. Cl.$^5$ .............................................. C08F 4/642
[52] U.S. Cl. ..................................... 526/125; 526/119; 526/128; 526/142; 526/348.4; 526/904; 502/107; 502/119; 502/125; 502/127; 502/134
[58] Field of Search ............... 526/119, 125, 128, 142; 502/107, 119, 127, 125, 134

[56] References Cited

U.S. PATENT DOCUMENTS

| | | | |
|---|---|---|---|
| 4,218,339 | 8/1980 | Zucchini et al. | 526/125 X |
| 4,363,746 | 12/1982 | Capshew | 526/125 X |
| 4,394,291 | 7/1983 | Hawley | 252/429 B |
| 4,562,168 | 12/1985 | Lee | 502/107 |
| 4,719,271 | 1/1988 | Dietz | 526/125 X |
| 4,988,655 | 1/1991 | Mitchell et al. | 526/904 X |

FOREIGN PATENT DOCUMENTS 0101978  3/1984  European Pat. Off. ............ 526/125

*Primary Examiner*—Fred Teskin
*Attorney, Agent, or Firm*—Marianne H. Michel

[57] ABSTRACT

A polymerization catalyst useful for the polymerization of olefins is prepared by contacting a metal dihalide compound having a metal selected from Group 2 and Group 12 of the Periodic Table and a transition metal compound which is a hydrocarbyloxide of a transition metal selected from Group 4 and Group 5 to thereby form a first catalyst component; contacting the first catalyst component with at least one organoaluminum precipitating agent to form a solid product; and contacting the solid product with an ester and then an activating agent to form a catalyst. Other aspects of the invention include a catalyst produced by the above described process and a polymerization process employing the thus produced catalyst.

14 Claims, No Drawings

POLYOLEFIN POLYMERIZATION PROCESS, PROCESS OF PRODUCING CATALYST, AND CATALYST

BACKGROUND OF THE INVENTION

This invention relates to transition metal catalysts and method for their production and use in the polymerization of olefins.

In the production of polyolefins, such as for example polyethylene, polypropylene, ethylene-butene copolymers, polymethylpentene, etc., an important aspect of the various processes and catalysts used to produce such polymers is the productivity. By productivity is means the amount or yield of solid polymer that is obtained by employing a given quantity of catalyst. If the productivity is high enough, then the amount of catalyst residues contained in the polymer is low enough that the presence of the catalyst residues does not significantly affect the properties of the polymer and the polymer does not require additional processing to remove the catalyst residues. As those skilled in the art are aware, removal of catalyst residues from a polymer is an expensive process and it is very desirable to employ a catalyst which provides sufficient productivity so that the catalyst residue removal is not necessary. High productivities are also desirable in order to minimize catalyst costs.

It is known in the art to use electron donors such as esters in the preparation of catalysts to produce stereoregular polymers. However, it would be desirable to develop new and improved catalysts and polymerization processes which provide stereoregular polymers and higher catalyst productivities.

SUMMARY OF THE INVENTION

Objects of the present invention are, therefore, to provide an olefin polymerization catalyst that provides relatively high productivity and also a process for producing such catalyst.

Another object is to provide a process for producing isotactic polymers using the above-mentioned catalyst.

In accordance with one aspect of the present invention, a process to prepare a catalyst is provided which comprises contacting a metal dihalide compound wherein the metal is selected from Group 2 and Group 12 of the Periodic Table, and a transition metal compound which is a hydrocarbyloxide of a transition metal selected from Group 4 and Group 5, to form a first catalyst component, contacting the first catalyst component with an organoaluminum precipitating agent to form a solid product, contacting the solid product with at least one ester, and then an activating agent to form a catalyst.

In accordance with other aspects of the invention a catalyst produced by the above described process and a polymerization process employing the catalyst are provided.

DETAILED DESCRIPTION OF THE INVENTION

The metal of the metal dihalide compound is selected from Group 2 and Group 12 metals of the Periodic Table. As used herein by the term "Periodic Table" is means the Periodic Table of the Elements shown as the new IUPAC form on the inside front cover of *Handbook of Chemistry and Physics*, 70th Edition, CRC Press, Inc. (1990).

As noted above, the metal of the metal dihalide compound is selected from Group 2 and Group 12 metals, such as for example beryllium, magnesium, calcium and zinc. Some suitable metal dihalide compounds include for example, beryllium dichloride, beryllium dibromide, magnesium dichloride, magnesium dibromide, magnesium diiodide, calcium dichloride, calcium cibromide, zinc dichloride, and zinc difluoride. Dichlorides are preferred dihalides. Magnesium dichloride is most preferred because it is readily available and relatively inexpensive and has provided excellent results.

The transition metal compound is a hydrocarbyloxide of a transition metal selected from Group 4 and Group 5 of the Periodic Table. Preferably, the transition metal compound is selected from the hydrocarbyloxides of titanium, zirconium, and vanadium although other transition metals can be employed. Titanium tetrahydrocarbyloxides are the most preferred compounds as they produce excellent results and are readily available. Suitable titanium tetrahydrocarbyloxide compounds include those expressed by the general formula $$Ti(OR)_4$$

wherein each R is individually selected from an alkyl, cycloalkyl, aryl, alkaryl, and aralkyl hydrocarbon radical containing from 1 to 20 carbon atoms per radical and each R can be the same or different. Titanium tetrahydrocarbyloxides in which the hydrocarbyl radical contains from 1 to 10 carbon atoms per radical are most often employed because they are more readily available. Suitable titanium tetrahydrocarbyloxides include, for example, titanium tetramethoxide, titanium dimethoxydiethoxide, titanium tetraethoxide, titanium tetra-n-butoxide, titanium tatrahexyloxide, titanium tetradecyloxide, titanium tetraeicosyloxide, titanium tatracyclohexyloxide, titanium tetrabenzyloxide, titanium tetra-p-tolyloxide, and titanium tatraphonoxide.

Of the titanium tetrahydrocarbyloxides, titanium tetraalkoxides are preferred and titanium tetra-n-butoxide is particularly preferred because of the excellent results obtained employing this material. Titanium tetra-n-butoxide is also generally available at a reasonable cost.

The molar ratio of the transition metal compound to the metal dihalide compounds can be selected over a relatively broad range. Generally the molar ratio is within the range of about 0.1:1 to about 10:1, preferably from 0.2:1 to 2:1.

The metal dihalide compounds and the transition metal compounds, as above described, can be reacted in the presence of a liquid diluent or solvent, or when at least one of the reagents is in the liquid state during the reaction, the use of diluent can be omitted. The metal dihalide compound and the transition metal compound employed in the present invention are normally mixed together in a suitable dry (essentially absence of water) diluent or solvent, which is essentially inert to these components and the product produced. By the term "inert" is means that the diluent does not chemically react with the dissolved components such as to interfere with the formation of the product or the stability of the product once it is formed. Such diluents include, for example, n-pentene, n-hexane, n-heptane, methylcyclohexane, toluene, and xylenes. Aromatic solvents are preferred, such as for example xylene because the solubility of the metal dihalide compound and the transition metal compound is higher in aromatic solvents as compared to aliphatic solvents, particularly at low temperatures.

Generally the amount of solvent or diluent employed can be selected over a broad range. Usually the amount of solvent or diluent is within the range of about 1 to about 100 cc per gram of metal dihalide compound, preferably from 20 to 100 cc per gram.

Temperatures for contacting the metal dihalide compound and the transition metal compound are generally within the range of from about 0° C. to about 150° C. and preferably from 10° C. to 150° C. The contacting temperatures employed could be higher if the pressure employed is above atmospheric pressure. The pressure employed during the contacting step does not appear to be a significant parameter.

Generally, the time required for contacting the metal dihalide compound and the transition metal compound is within the range of about 5 minutes to about 10 hours, although in most instances a time within the range of 15 minutes to 3 hours is sufficient. Following the contacting operation, the resulting solution can be filtered to remove any undissolved material or extraneous solid, if desired.

In a preferred embodiment, water is employed in preparing the first catalyst component. Generally, 0.5 to 1.5 moles of water per mole of metal dihalide are employed.

In a preferred embodiment of this invention, a phenol is also employed in preparing the first catalyst component. The term "phenol" is used herein to refer to substituted as well as unsubstituted phenolic compounds. Typical examples include phenol, o-methylphenol, m-methylphenol, p-methylphenol, 4-phenylphenol, o-fluorophenol, m-fluorophenol, p-fluorophenol, p-sec-butylphenol, p-ethylphenol, p-methoxyphenol, and mixtures thereof. The preferred phenols have 6 to 12 carbon atoms per molecule. Of those, 4-phenylphenol is the most preferred.

The molar ratio of the phenol employed relative to the transition metal compound can vary over a relatively broad range. Generally the molar ratio is within a range of from about 0.1:1 to about 10:1 and preferably from 0.2:1 to 5:1.

The organoaluminum precipitating agent is an organoaluminum compound containing at least one hydrocarbyl radical, wherein the hydrocarbyl radical is selected from hydrocarbyl radicals selected from alkyl, cycloalkyl, aryl, alkaryl, and aralkyl hydrocarbon radicals containing 1 to 20 carbon atoms per radical. Typical examples include triethylaluminum, trimethylaluminum, methylaluminum dibromide, ethylalmunium dichloride, ethylaluminum diiodide, isobutylaluminum dichloride, dodecylaluminum dibromide, dimethylaluminum bromide, diethylaluminum chloride, diisopropylaluminum chloride, methyl-n-propylaluminum bromide, di-n-octylaluminum bromide, diphenylaluminum chloride, dicyclohexylaluminum bromide, dieicosylaluminum chloride, methylaluminum sesquibromide, ethylaluminum sesquichloride, ethylaluminum sesquiiodide, and mixtures thereof. Currently, organoaluminum halides are preferred and diethylaluminym chloride and ethylaluminum sesquichloride are most preferred for higher catalyst activities.

The molar ratio of the transition metal compound to the organoaluminum precipitating agent can be selected over a relatively broad range. Generally, the molar ratio is within a range of from about 0.1:1 to 10:1 and preferably within a range of 0.1:1 to 3:1.

The contacting of the first catalyst component and the organoaluminum precipitating agent can be carried out either in the presence of a liquid diluent or in the absence of such diluent, when at least one of the reagents is in the liquid state. Preferably, a liquid solution of the metal dihalide compound and the transition metal compound is contacted with a hydrocarbon solution of the organoaluminum precipitating agent. Diluents or solvents which can be employed in preparing the first catalyst component, as described above, are suitable.

The temperature employed while contacting the first catalyst component and the organoaluminum precipitating agent can be selected over a broad range. Generally the temperature employed is within a range of about −40° C. to about 150° C., preferably within the range of 15° C. to 150° C., and most preferably within the range of 80° C. to 150° C. Since heat is evolved when the first catalyst component and the organoaluminum precipitating agent are contacted, the contacting rate is adjusted as required and additional cooling can be employed in order to maintain a relatively constant temperature. It is noted that the order of addition is not important and either component can be added to the other.

The resulting slurry is stirred or agitated for a sufficient time, generally within a range of about 5 minutes to about 10 hours, preferably from 15 minutes to 3 hours, to insure that mixing of the components is complete. Thereafter the solid product can be recovered by filtration or decantation. In a preferred embodiment, a hydrocarbon, such as n-pentane, n-hexane, n-heptane, and cyclohexane can be mixed with the slurry to increase the amount of solid product formed. The solid product can then be washed with the hydrocarbon to remove any soluble material which may be present. The preferred hydrocarbons are n-hexane and n-heptane due to availability and improved solids recovery.

It has been found that very useful catalysts are produced when an ester is contacted with the solid product produced after precipitation with the organoaluminum precipitating agent.

Esters that can be employed include alkyl or aromatic esters of linear or cyclic carboxylic acids having from 2 to 20 carbon atoms. Examples of suitable esters include methyl formate, ethyl formate, methyl acetate, ethyl acetate, n-propyl acetate, n-butyl acetate, ethyl octanoate, n-butyl-eicosanoate, methyl anisate, methyl benzoate, ethyl benzoate, ethyl p-methoxybenzoate, diisobutyl phthalate, methyl p-toluate, diethyl carbonate, dimethyl maleate, methyl ethyl carbonate, di-(3-methylbutyl)carbonate, diphenyl carbonate, ethyl toluate, ethyl p-butoxybenzoate, ethyl p-methoxybenzoate, butylbenzoate, ethyl o-chlorobenzoate, ethyl naphthenate, ethyl cyclohexanoate, ethyl privalate, and mixtures thereof. The preferred esters are those having 8 to 12 carbon atoms per molecule. Ethyl benzoate is especially preferred for preparing a catalyst having high productivity and selectivity for the more desirable insulable polymer product.

The molar ratio of ester employed relative to the transition metal compound can vary from about 0.1:1 to about 5:1, preferably from 0.2:1 to 3:1.

The temperature employed in contacting the solid product and the ester after precipitation can be selected over a relatively broad range, generally in the range of about 0° C. to about 150° C., preferably 20° C. to 120° C.

The contacting time can also be selected over a broad range and generally is within the range of about 5 minutes to about 10 hours, although in most instances a time within the range of 15 minutes to 3 hours is sufficient.

Subsequent to contacting the solid product and the ester, the reaction mixture is contacted with an activating agent. The activating agent comprises at least one halogen-containing compound of an element selected from Groups 4, 5, 14, and 15 capable of adding halogen to the catalyst. Some typical examples include chlorine-containing compounds of Si, Ge, Sn, P, C, Ti, V, and Zr. Some specific compounds of that type include $COCl_2$, $PCl_3$, $SiCl_4$, $SnCl_4$, $CCl_4$, $HSiCl_3$, $VOCl_3$, $ZrCl_4$, and acid chlorides of the formula RCOCl where R is an aliphatic or aromatic radical containing 1 to 20 carbon atoms. The activating agent preferably comprises chlorine-containing compounds of titanium. The currently preferred activating agent comprises titanium tetrachloride and trichlorosilane. The ratio of the titanium tetrachloride to the trichlorosilane can vary over a wide range. It is currently preferred that the weight of titanium tetrachloride is greater than that of the trichlorosilane. In a currently most preferred embodiment, the activating agent is a mixture of titanium tetrachloride, trichlorosilane, and silicon tetrachloride. Here again the relative amounts of the various components of the activating agent can vary, however, it is generally preferred that the trichlorosilane be employed in a greater weight basis than the silicon tetrachloride and that titanium tetrachloride be employed in a greater weight basis than the trichlorosilane. Typical values for the weight ratio of the titanium tetrachloride:trichlorosilane:silicon tetrachloride would be in the range of about 3:2:1 to about 5:4:1.

While the weight ratio of the activating agent to the solid product can be selected over a relatively broad range, the weight ratio of the activating agent to the solid product is generally within a range of about 0.1:1 to about 100:1 and preferably from 0.5:1 to 60:1.

Generally the reaction of the solid product with the ester and the activating agent can be carried out neat or in a liquid medium in which the activating agent is soluble. Any suitable diluent can be employed. Examples include normally liquid hydrocarbon such as n-pentane, n-hexane, n-heptane, cyclohexane, benzene, and xylene.

The temperature employed in contacting the solid product and the activating agent can be selected over a relatively broad range, generally in the range of about 0° C. to about 150° C., preferably 20° C. to 120° C. It is noted that the order of addition is not important and either component can be added to the other.

In a preferred embodiment, the activation is carried out at a pressure of at least 70 psi. a particularly effective pressure range would be about 70 psi to about 95 psi, or more preferably 85 psi to 95 psi.

The contacting time of the solid product and the activating agent can be selected over a broad range and is the time sufficient to insure that mixing of the components is complete. Generally the contacting time is within the range of about 10 minutes to about 10 hours, preferably from 15 minutes to 3 hours. It is noted that the order of addition is not important and either component can be added to the other. Preferably the mixture is stirred or agitated during contacting.

Following the treatment of the solid product with the activating agent, the surplus activating agent can be removed by washing the solid catalyst with a dry (essential absence of water) liquid such as a hydrocarbon of the type previously discussed, n-hexane, or xylene for example. The thus activated catalyst, after drying, can be stored under an inert atmosphere, such as dry nitrogen.

If desired, the catalyst can be admixed with a particulate diluent such as, for example, silica, silica-alumina, silica-titania, magnesium dichloride, magnesium oxide, polyethylene, polypropylene, or poly(phenylene sulfide), prior to using the catalyst in a polymerization process. While the weight ratio of the particulate diluent to catalyst can be selected over a relatively wide range, the weight ratio of particulate diluent to catalyst generally is within the range of about 100:1 to about 1:100. More often, the weight ratio of particulate diluent to catalyst is within the range of about 20:1 to about 2:1 and use of a particulate diluent can facilitate charging of the catalyst to the reactor.

A variety of polymerizable compounds are suitable for use in the process of the present invention. Olefins which can be homopolymerized or copolymerized with the invention catalysts include aliphatic mono-1-olefins. While the invention would appear to be suitable for use with any aliphatic mono-1-olefin, those olefins having 2 to 18 carbon atoms are most often used. Aliphatic mono-1-olefins can be copolymerized with other 1-olefins and/or with other smaller amounts of other ethylenically unsaturated monomers, such as 1,3-butadiene, isoprene, 1,3-pentadiene, styrene, alpha-methylstyrene, and similar ethylenically unsaturated monomers which do not impair the catalyst. The present catalyst is particularly useful for the polymerization of 4-methyl-1-pentene.

The catalysts of this invention can also be utilized to prepare homopolymers and copolymers of conjugated diolefins. Generally the conjugated diolefins contain 4 to 8 carbon atoms per molecule. Examples of suitable conjugated diolefins include 1,3-butadiene, 2-methyl-1,3-butadiene (isoprene), 1,3-pentadiene, and 1,3-octadiene. Suitable comonomers, besides the conjugated diolefins listed above include mono-1-olefins previously described and vinylaromatic compounds generally. Some suitable vinylaromatic compounds are those having from 8 to 14 carbon atoms per molecule, and include for example styrene and various alkylstyrenes, such as 4-ethylstyrene and such as 1-vinyl-naphthalene.

The weight percent of the conjugated diolefin based on the total copolymerization mixture can be selected over a relatively broad range. Generally the weight percent of the conjugated diolefin is from about 10 to about 95 weight percent and the other comonomers are from about 90 to about 5 weight percent. However, the weight percent of the conjugated diolefin is preferably from about 50 to about 90 weight percent and the other comonomers are from about 50 to about 10 weight percent.

The inventive catalysts are particularly well suited for producing isotactic polymethylpentene, providing high productivity as well as low soluble polymer formation.

While it may not be necessary in all instances to employ a cocatalyst with the catalyst of the present invention, the use of cocatalysts is recommended for best results. The cocatalysts suitable for use in accordance with the invention can be selected from among the hydrides and organometallic compounds of metals of Groups 1, 2, 12, and 13 of the Periodic Table. Of the organometallic cocatalysts, organoaluminum compounds are preferred, the most preferred organoaluminum cocatalysts are compounds of the formula $R'_3Al$ wherein each $R'$ is individually selected from hydrocarbyl radicals containing 1 to 20 carbon atoms per radical. Typical examples include, trimethylaluminum, triethylaluminum, triisopropylaluminum, tridecylaluminum, triesosylaluminu, tricyclohexylaluminum, triphenylaluminum, and 2-methylpentyldiethylaluminum. Triethylaluminum is preferred since this compound has produced excellent results.

The molar ratio of the organometallic compound of the cocatalyst to the transition metal compound of the first catalyst component is not particularly critical and can be selected over a relatively broad range. Generally, the molar ratio of the organometallic compound of the cocatalyst to the transition metal compound of the first catalyst component is within a range of about 0.01:1 to about 1500:1, preferably from 0.1:1 to 200:1. When the cocatalyst comprises at least one organoaluminum compound, typically there is employed about 0.25 to about 15 milligrams of the titanium-containing catalyst per millimole of organoaluminum cocatalyst.

In some cases it may be desirable to use a multi-component cocatalyst system comprising triethylaluminum and either aromatic esters such as ethylanisate, ethylbenzoate and methyl-p-toluate, etc.; or silanes such as diphenyl dimethoxysilane, triphenyl ethoxysilane, methyl triethoxysilane, etc.

In general the catalyst of this invention can be used with the same types of cocatalyst systems and in the same manner as disclosed in U.S. Pat. Nos. 4,588,703, 4,394,291, and 4,477,588, which are incorporated herein by reference.

The polymerization process according to the present invention can be conducted in a solution phase process, in the presence or absence of an inert hydrocarbon diluent, in a particular form process, or in a gas phase process.

The polymerization process employing the catalysts and cocatalysts as above described can be performed either batchwise or continuously. In a batch process, for example, a stirred autoclave is prepared for use by first purging with an inert gas, such as nitrogen, and then with a suitable compound, such as isobutane for example. When the catalyst and cocatalyst are employed, either can be charged to the reactor first or they can be charged simultaneously through an entry port under an isobutane purge. After closing the entry port, hydrogen, if used, is added, and then a diluent such as isobutane is added to the reactor. The reactor is heated to the desired reaction temperature, which for polymerizing 4-methyl-1-pentene, for example, is, for best results, generally within a range of about 20° C. to about 120° C. and the monomer is then admitted and maintained at a partial pressure within a range of about 5 psig to about 725 psig. At the end of the designated reaction period, the polymerization reaction is terminated and the unreacted olefin and isobutane are vented. The reactor is opened and the polymer, is collected as a free-flowing white solid and is dried to obtain the product.

In a continuous process, for example, a suitable reactor such as a loop reactor is continuously charged with suitable quantities of solvent or diluent, catalyst, cocatalyst, polymerizable compounds and hydrogen, if any, and in any desirable order. The reactor product is continuously withdrawn and the polymer recovered as appropriate, generally by flashing the diluent (solvent) and unreacted monomers and drying the resulting polymer.

The olefin polymers made with the catalysts of this invention are useful in preparing articles by conventional polyolefin processing techniques such as injection molding, rotational molding, and extrusion of film.

The following example will serve to show the present invention in detail by way of illustration and not by way of limitation.

EXAMPLE

The following example demonstrates that catalyst activity can be affected by contacting an ester at various steps in the preparation of the catalyst. Catalysts prepared by contacting an ester after precipitation exhibited higher activity. Ethyl benzoate was added to the catalyst preparation at different stages of preparation.

A large batch of activating agent was prepared and used in the preparation of all catalysts described. In a large cylinder, 59 lbs trichlorosilane, 24 lbs, silicon tetrachloride, and 109 lbs titanium tetrachloride were combined. The activating agent was added in the amount and manner described for each catalyst.

The catalysts were employed in the polymerization of 4-methyl-1-pentene under similar conditions. The polymerizations were carried out in a one gallon stirred stainless steel autoclave. To the clean reactor purged with nitrogen, at room temperature, approximately 1,350 g of liquid 4-methyl-1-pentene were charged via a nitrogen push. The cocatalyst was charged, 8.5 mL (approximately 4.6 mmol/L in toluene) of triethylaluminum, followed by a weighed amount of catalyst. The reactor was sealed and the desired amount of hydrogen, approximately 25 psig pressure drop over a 300 mL vessel, was added. The reactor was stirred for one minute and nitrogen was added to bring the pressure of the reactor to approximately 10 psig. The reactor was brought to about 50° C. and maintained for about 1 hour. The reactor was cooled by venting and using cooling water. The liquid portion was then siphoned off and the monomer was evaporated leaving the soluble polymer which was weighed and the percent solubles were determined. The solid polymer was recovered and allowed to dry.

The catalyst in Run 1 was prepared by adding the ester, ethyl benzoate, before adding titanium tetra-n-butoxide. The catalyst was prepared by mixing 153.0 g of xylene, 1.75 g anhydrous $MgCl_2$, 0.43 g of distilled water, and 4.76 g of 4-phenylphenol in a glass bottle. After heating the reactants to 90°-100° C. for 15 minutes, 0.53 g of ethyl benzoate were added to the glass bottle. The bottle was capped and placed in an oil bath at 94° C. The reactants were stirred continuously for 30 minutes at a maximum temperature of 122° C. To the reaction mixture, 3.30 g of titanium tetra-n-butoxide were added and the reactants were maintained at 90°-100° C. for 72 minutes. To the reaction mixture, 9.03 g of ethylaluminum sesquichloride (EASC) in toluene, were added slowly. The temperature was maintained between 107° C. and 112° C. for a period of 30 minutes. The reactants were cooled to 30° C. and all but ¼" of the liquid was decanted. The solids and remaining liquid were allowed to stand overnight. Additional liquid was decanted leaving 17.6 g of decanted solids. The solids were washed 3 times with hexane and excess hexane was decanted leaving 14.0 g of solids. The solids were activated with 533.4 g of the activating agent prepared as described above. The reaction mixture was heated to 105° C. for 1 hours. The thus activated solids were cooled to 30° C., allowed to stand overnight, and washed 3 times with hexane and then dried. The reaction product was the catalyst used in Run 1.

The catalyst in Run 2 was prepared by adding the ester, ethyl benzoate, before adding titanium tetra-n-butoxide. The catalyst was prepared by mixing 153.1 g of xylene, 0.44 g of distilled water, 1.78 g of anhydrous MgCl$_2$, 4.75 g of 4-phenylphenol, and 0.53 g of ethyl benzoate in a glass bottle. The reactants were heated to 90.4° C. for 30 minutes. To the reaction mixture, 3.28 g of titanium tetra-n-butoxide were added. The temperature was maintained at 90°–100° C. for 1 hour. The reactants were cooled to room temperature and 9.57 g EASC in toluene were added and stirred for 30 minutes. The liquid was decanted and the solids were washed once with hexane and left overnight. The solids were washed two more time in hexane, leaving 13.2 g of decanted solids. To the solids, 582.1 g of activating agent were added and the mixture was heated to 100° C. for 60 minutes and then cooled to 30° C. The mixture was allowed to stand overnight and the activated solids were then washed 3 times with hexane and then dried. The reaction product was the catalyst used in Run 2.

The catalyst in Run 3 was prepared by adding the ester, ethyl benzoate, after the addition of titanium tetra-n-butoxide. The catalyst was prepared by mixing 153.1 g of xylene, 0.44 g of distilled water, and 1.76 g of anhydrous MgCl$_2$ in a glass bottle. The reactants were heated at 48° C. for 2 hours and 25 minutes. The reactants were then cooled to 30° C. and 0.5 g of 4-phenylphenol and 3.28 g of titanium tetra-n-butoxide were added. The reactants were heated at 90°–100° C. for 15 minutes. To the reaction mixture, 0.53 g of ethyl benzoate were added and the temperature was maintained at 90°–100° C. for 45 minutes. The reactants were allowed to cool to room temperature and stand overnight. The reactants were again heated to 100° C. and 9.01 g ethylaluminum sesquichloride (EASC) were added. The reactants were stirred for 30 minutes and 3 inches of hexane were added. The temperature was brought to 104° C. and the mixture stirred for 42 minutes. The liquid was decanted leaving 90.0 g decanted solids. The solids were washed 3 times with hexane and let stand at room temperature over the weekend. Excess hexane was decanted leaving 59.5 g decanted solids. The solids were activated with 570.9 g of activating agent. The reaction mixture was heated to 94° C. for one hour. After cooling the activated solids were washed 3 times with hexane and then dried. The reaction product was the catalyst used in Run 3.

The catalyst in Run 4 was prepared by adding the ester, ethyl benzoate, after precipitation with ethylaluminum sesquichloride (EASC). The catalyst was prepared by mixing 153.3 g xylene, 0.43 g distilled water, 1.76 g anhydrous MgCl$_2$, 0.50 g of 4-phenylphenol, and 3.28 g titanium tetra-n-butoxide in a glass bottle. The reactants were heated to 124° C. and 9.21 g of ethylaluminum sesquichloride were added. The temperature increased to 142° C., the reaction mixture was stirred for 30 minutes, and 292.1 g hexane were added. While stirring, 0.54 g of ethyl benzoate were added. The reaction was allowed to continue for 30 minutes and the mixture was cooled to 30° C. The liquid was decanted leaving 174.4 g decanted solids. The solids were washed 3 times with hexane leaving 196.0 g of solids. The solids were activated with 688.5 g of activating agent. The mixture was heated to 100° C. for 60 minutes, cooled, and the activated solids were washed 3 times with hexane and then dried. The reaction product was the catalyst used in Run 4.

The variables and results of the catalysts described above are summarized in Table I. The point of addition referred to in Table I, is the point in the process where ester was added to the catalyst preparation. The amount of 4-phenylphenol added in grams is represented by 4-PP in the table. The precipitation temperature in °C. is represented by Pptn. Activity, or productivity, is reported as grams polymer/gram catalyst/hour.

TABLE I

| Run | Point of Ester Addition | 4-PP (grams) | Pptn. (°C.) | Activity (g/g cat/hr) |
| --- | --- | --- | --- | --- |
| 1 | Before Ti(BuO)$_4$ | 4.76 | 107 | 70 |
| 2 | Before Ti(BuO)$_4$ | 4.75 | 30 | 6,200 |
| 3 | After Ti(BuO)$_4$ | 0.5 | 104 | 7,900 |
| 4 | After Pptn. | 0.5 | 133 | 13,600 |

These results demonstrate an increase in activity of at least 72 percent and as much as 200 times, when the ester was added after precipitation While this invention has been described in detail for the purpose of illustration, it is not to be construed as limited thereby, but is intended to cover all changes and modifications within the spirit and scope thereof.

That which is claimed is:

1. A process for preparing a catalyst suitable for the polymerization of olefins comprising:
    (1) contacting a metal dihalide compound and a transition metal compound to form a first catalyst component,
    wherein the metal in said metal dihalide compound is selected from Group 2 and Group 12 metals of the Periodic Table,
    wherein said transition metal compound is a hydrocarbyloxide of a transition metal selected from Group 4 and Group 5 of the Periodic Table;
    (2) contacting said first catalyst component and an organoaluminum precipitating agent to form a solid product,
    wherein said organoaluminum precipitating agent contains at least one hydrocarbyl radical selected from hydrocarbyl radicals containing 1 to 20 carbon atoms per radical;
    (3) contacting said solid product and an ester,
    wherein said ester is selected from alkyl or aromatic esters of linear or cyclic carboxylic acids having from 2 to 20 carbon atoms; and
    (4) after step (3) contacting said solid product and an activating agent to form said catalyst,
    wherein said activating agent comprises at least one halogen-containing compound of an element selected from groups 4, 5, 14, and 15 capable of adding halogen to said catalyst.

2. A process according to claim 1 further comprising contacting a phenol in step (1).

3. A process according to claim 2 wherein the molar ratio of said transition metal compound to said metal dihalide compound is within the range of about 0.1:1 to about 10:1;
    the molar ratio of said transition metal compound to said organoaluminum precipitating agent is within the range of about 0.1:1 to about 10:1;
    the molar ratio of said ester to said transition metal compound is within the range of about 0.1:1 to about 5:1; and the weight ratio of said activating agent to said solid product is within the range of about 0.1:1 to about 100:1.

4. A process according to claim 3 wherein said metal dihalide is a magnesium dihalide;

said transition metal compound is represented by the formula $$Ti(OR)_4$$

wherein each R is individually selected from alkyl, cycloalkyl, aryl, alkaryl, and aralkyl hydrocarbon radicals containing from 1 to 20 carbon atoms per radical and each R can be the same or different;

said organoaluminum precipitating agent is an organoaluminum halide;

said ester is selected from esters having 8 to 12 carbon atoms; and said activating agent comprises chlorine-containing compounds of titanium.

5. A process according to claim 4 wherein said contacting in step (1) is carried out at a temperature of from about 0° C. to about 150° C., for a time within the range of about 5 minutes to about 10 hours;

said contacting in step (2) is carried out at a temperature of from about −40° C. to about 150° C., for a time within the range of about 5 minutes to about 10 hours;

said contacting in step (3) is carried out at a temperature of from about 0° C. to about 150° C., for a time within the range of about 5 minutes to about 10 hours; and said contacting in step (4) is carried out at a temperature of from about 0° C. to about 150° C., for a time within the range of about 10 minutes to about 10 hours.

6. A catalyst produced according to the process of claim 1.

7. A process for the polymerization of at least one mono-1-olefin monomer comprising contacting said at least one monomer under polymerization conditions with the catalyst of claim 6.

8. A process according to claim 7 wherein said at least one monomer is also contacted with a cocatalyst selected from the hydrides and organometallic compounds of metals selected from Groups 1, 2, 12, and 13 of the Periodic Table.

9. A process for preparing a catalyst comprising:

(1) contacting magnesium dichloride and titanium tetra-n-butoxide to form a first catalyst component;

(2) contacting said first catalyst component and ethylaluminum sesquichloride to form a solid product;

(3) contacting said solid product and an ester comprising ethyl benzoate; and (4) after step (3) contacting said solid product and an activating agent comprising $SiCl_4$, $SiHCl_3$, and $TiCl_4$ to form said catalyst;

wherein the molar ratio of said titanium tetra-n-butoxide to said magnesium dichloride is within the range of 0.2:1 to 2:1;

the molar ratio of said titanium tetra-n-butoxide to said ethylaluminum sesquichloride is within the range of 0.1:1 to 3:1;

the molar ratio of said ester to said titanium tetra-n-butoxide is within the range of 0.2:1 to 3:1;

the weight ratio of said activating agent to said solid product is within the range of 0.5:1 to 60:1;

wherein said contacting in step (1) is carried out at a temperature of from 10° C. to 150° C., for a time within the range of 15 minutes to 3 hours;

said contacting in step (2) is carried out at a temperature of from 15° C. to 150° C., for a time within the range 15 minutes to 3 hours; and said contacting in step (3) and step (4) is carried out at a temperature of from 20° C. to 120° C., for a time within the range of 15 minutes to 3 hours.

10. A process according to claim 9 wherein the weight ratio of the titanium tetrachloride:trichlorosilane:silicon tetrachloride is in the range of about 3:2:1 to about 5:4:1.

11. A catalyst produced according to the process of claim 10.

12. A process for the polymerization of at least one olefin comprising contacting said at least one olefin under polymerization conditions with the catalyst of claim 11.

13. A process according to claim 12 wherein said at least one olefin is 4-methyl-1-pentene.

14. A process according to claim 13 wherein said 4-methyl-1-pentene is also contacted with a cocatalyst selected from compounds represented by the forumla $$R'_3Al$$

wherein each R' is individually selected from hydrocarbyl radicals containing 1 to 20 carbon atoms per radical and wherein the molar ratio of said cocatalyst to said transition metal compound is within the range of about 1500:1 to about 1:100.

* * * * *